(12) United States Patent
McCord et al.

(10) Patent No.: US 6,597,006 B1
(45) Date of Patent: Jul. 22, 2003

(54) DUAL BEAM SYMMETRIC HEIGHT SYSTEMS AND METHODS

(75) Inventors: Mark McCord, Mountain View, CA (US); Jun Pei, Campbell, CA (US)

(73) Assignee: KLA-Tencor Technologies Corp., Milpitas, CA (US)

( * ) Notice: Subject to any disclaimer, the term of this patent is extended or adjusted under 35 U.S.C. 154(b) by 92 days.

(21) Appl. No.: 09/974,560

(22) Filed: Oct. 9, 2001

(51) Int. Cl.[7] ............................. G01N 21/86; G01V 8/00
(52) U.S. Cl. ............................. 250/559.19; 250/559.29; 356/237.2
(58) Field of Search ......................... 250/559.19, 559.2, 250/559.29, 559.3, 559.4, 559.41, 202, 208.1; 356/237.1, 237.2, 237.3–237.5, 239.7, 239.8, 400, 431; 348/126, 87, 95

(56) References Cited

U.S. PATENT DOCUMENTS

| | | | | |
|---|---|---|---|---|
| 4,972,344 A | * | 11/1990 | Stoddard et al. | 369/18 |
| 5,225,886 A | * | 7/1993 | Koizumi et al. | 356/237.4 |
| 5,929,983 A | * | 7/1999 | Lu | 356/138 |
| 6,084,664 A | * | 7/2000 | Matsumoto et al. | 356/237.4 |

\* cited by examiner

*Primary Examiner*—Kevin Pyo
*Assistant Examiner*—Seung C. Sohn
(74) *Attorney, Agent, or Firm*—Ann Marie Mewherter; Conley Rose P.C.

(57) ABSTRACT

Systems and methods for determining the height of a surface of a specimen, such as a surface of a semiconductor device wafer are provided. A system may be configured to generate a comparison signal that may used to alter a Z-axis fine height adjustment of the system. The system may include for example, a processing tool, a metrology tool, or an inspection tool that may be used in semiconductor device fabrication. In this manner, the system may be configured to maintain a constant working distance between the wafer surface and an optical column of the system. A system may include an off-axis dual beam symmetric height sensor due to mechanical constraints of the system. The dual beam symmetric height sensor may provide automatic focusing of the wafer with high precision by substantially eliminating wafer pattern-induced error in comparison signals generated by the system.

25 Claims, 8 Drawing Sheets

DUAL BEAM SYMMETRIC HEIGHT SYSTEMS AND METHODS

BACKGROUND OF THE INVENTION

1. Field of the Invention

The present invention generally relates to systems and methods for determining a height of a specimen. Certain embodiments relate to systems and methods that may include a dual beam symmetric height sensor coupled to a processing tool, a metrology tool, or an inspection tool.

2. Description of the Relevant Art

Fabricating semiconductor devices such as logic and memory devices may typically include processing a specimen such as a semiconductor wafer using a number of semiconductor fabrication processes to form various features and multiple levels of the semiconductor devices. For example, lithography is a semiconductor fabrication process that typically involves transferring a pattern to a resist arranged on a semiconductor wafer. Additional examples of semiconductor fabrication processes may include, but are not limited to, chemical-mechanical polishing, etch, deposition, and ion implantation. Multiple semiconductor devices may be fabricated in an arrangement on a semiconductor wafer and then separated into individual semiconductor devices.

As feature sizes of semiconductor devices continue to shrink, minimum feature sizes that may be successfully fabricated may often be limited by performance characteristics of semiconductor fabrication processes such as lithography and etch processes. Examples of performance characteristics of a lithography process include, but are not limited to, resolution capability, across chip linewidth variations, and across wafer linewidth variations. In optical lithography, such performance characteristics may be determined by a number of process parameters such as the quality of resist application, the performance of the resist, the exposure tool, and the wavelength of light which is used to expose the resist. The ability to resolve a minimum feature size, however, may also be strongly dependent on other critical parameters of lithography processes such as a temperature of a post exposure bake process or an exposure dose of an exposure process. As such, controlling the parameters of processes which are critical to the resolution capability of semiconductor fabrication processes such as lithography processes is becoming increasingly important to the successful fabrication of semiconductor devices.

Controlling critical process parameters may typically include assessing the performance characteristics of semiconductor fabrication processes such as resolution capability, across chip linewidth variations, and across wafer linewidth variations. As the dimensions of semiconductor devices continue to shrink with advances in semiconductor materials and processes, however, the ability to examine microscopic features and to detect microscopic defects in semiconductor devices has become increasingly difficult. Significant research has been focused on increasing resolution limits of metrology tools that are used to examine microscopic features and defects. Optical microscopes generally may have an inherent resolution limit of approximately 200 nm and may have limited usefulness in current manufacturing processes. Microscopes that utilize electron beams to examine devices, however, may be used to investigate feature sizes as small as, e.g., a few nanometers. Therefore, tools that utilize electron beams to inspect semiconductor devices are becoming integral to semiconductor fabrication processes. For example, in recent years, scanning electron microscopy has become increasingly popular for the inspection of semiconductor devices. Scanning electron microscopy typically involves scanning an electron beam over a specimen and generating an image of the specimen by detecting electrons that are reflected, scattered, or transmitted from the specimen.

During each semiconductor device fabrication process, defects such as particulate contamination and pattern defects may be introduced into the semiconductor devices. Such defects may be isolated to a single semiconductor device on a semiconductor wafer containing several hundred semiconductor devices. For example, isolated defects may be caused by random events such as an unexpected increase in particulate contamination in a manufacturing environment or an unexpected increase in contamination in process chemicals that may be used in fabrication of the semiconductor devices. Alternatively, the defects may be repeated in each semiconductor device formed across an entire semiconductor wafer. In an example, repeated defects may be systematically caused by contamination or defects on a reticle. A reticle, or a mask, may be disposed above a semiconductor wafer and may have substantially transparent regions and substantially opaque regions that are arranged in a pattern that may be transferred to a resist on the semiconductor wafer. Therefore, contamination or defects on a reticle may also be reproduced in the pattern transferred to the resist and may undesirably affect the features of each semiconductor device formed across an entire semiconductor wafer in subsequent processing.

Defects on semiconductor wafers may typically be monitored manually by visual inspection, particularly in the lithography process because many defects generated during a lithography process may be visible to the naked eye. Such defects may include macro defects that may be caused by faulty processes during this step. Defects that may be visible to the human eye typically have a lateral dimension greater than or equal to approximately 100 $\mu$m. Defects having a lateral dimension as small as approximately 10 $\mu$m, however, may also be visible on unpatterned regions of a semiconductor wafer. An example of a visual inspection method is illustrated in U.S. Pat. No. 5,096,291 to Scott and is incorporated by reference as if fully set forth herein. Prior to the commercial availability of automated defect inspection systems such as the systems illustrated in U.S. Pat. No. 5,917,588 to Addiego and U.S Pat. No. 6,020,957 to Rosengaus et al., which are incorporated by reference as if fully set forth herein, manual inspection was the most common, and may still be the most dominant, inspection method used by lithography engineers.

Automated inspection systems were developed to decrease the time required to inspect a wafer surface. Such inspection systems may typically include two major components such as an illumination system and a collection-detection system. An illumination system may include a light source such as a laser that may produce a beam of light and an apparatus for focusing and scanning the beam of light. Defects present on the surface may scatter the incident light. A detection system may detect the scattered light and may convert the detected light into electrical signals that may be measured, counted, and displayed on an oscilloscope or other monitor. Examples of such inspection systems are illustrated in U.S. Pat. No. 4,391,524 to Steigmeier et al., U.S. Pat. No. 4,441,124 to Heebner et al., U.S. Pat. No. 4,614,427 to Koizumi et al., U.S. Pat. No. 4,889,998 to Hayano et al., and U.S. Pat. No. 5,317,380 to Allemand, all of which are incorporated by reference as if fully set forth herein.

Systems used to manufacture semiconductor devices such as processing tools, metrology tools, and inspection tools may include a height sensor. A height sensor may be used to position a wafer within a system prior to the processing of the wafer. Height sensors may be used in different configurations for different applications. For example, height sensors may be used in wafer probe applications. Examples of such height sensors are illustrated in U.S. Pat. Nos. 4,328,553 to Fredriksen et al., and 5,948,972 to Samsavar et al., which are incorporated by reference as if fully set forth herein. In addition, height sensors may be used in wafer inspection applications. Examples of such height sensors are illustrated in U.S. Pat. Nos. 6,107,637 to Watanabe et al., 6,140,644 to Kawanami et al., and 6,172,365 to Hiroi et al., all of which are incorporated by reference as if fully set forth herein.

Further examples of height sensors configured for use in metrology tools, microscopes and lithography tools may be found in U.S. Pat. Nos. 4,788,431 to Eckes et al., 5,585,629 to Doran et al., and 6,208,407 to Loopstra, which are incorporated by reference as if fully set forth herein. For example, Loopstra discloses that in measurement of a height of each substrate field, the field and a first height sensor are moved with respect to each other in a plane perpendicular to the axis of a projection beam. A second height sensor is used for measuring a height of a substrate support reference plane and a height of the substrate support reference plane associated with an ideal height of a relevant substrate field is subsequently computed and stored. After the substrate has been introduced into the projection beam, the value of the height for each substrate field is checked by means of a third height sensor.

SUMMARY OF THE INVENTION

Several height sensors that may be used as focusing sub-systems for processing, metrology, and inspection systems are currently available. Many of these height sensors may be coupled on-axis to a system in a through-the-lens configuration. The term, "through-the-lens configuration," as used herein, generally refers to a system in which the height measurement location is substantially the same as a sample location of a lithographic or metrology system, and in which light of the height sensor passes through at least one lens of the lithographic or metrology system. Therefore, many of these height sensors may be of limited use to systems with mechanical and/or physical constraints. Other height sensors are currently available that may be coupled on- or off-axis to a system. The term, "on-axis height sensor subsystem," as used herein, generally refers to a system in which the height measurement location is substantially the same as a sample location of a lithographic or metrology system. The term "off-axis height sensor sub-system," as used herein, generally refers to a system in which the height measurement location is not the same as a sample location of a lithographic or metrology system. Such height sensors, however, may not be able to achieve a high level of precision due to wafer pattern-induced measurement errors.

Patterns on a specimen such as topographical features, which may be formed upon or within a specimen such as a wafer, diffraction effects, and/or thin film interference effects may affect a height sensitive image such as a spot projected onto a detector. Such a detector may include, for example, a position sensitive detector ("PSD"), or device. A location of a centroid on a PSD may be used to determine the height of the specimen. Patterns of the specimen may reduce an intensity of the image on the PSD by up to about 90%. If the patterns also cause intensity variations across the image on the PSD, an apparent location of the centroid may be shifted. Therefore, such a shift in the apparent location of the centroid may introduce error into height determinations of the specimen. In a worst case scenario, for example, an apparent location of the centroid may be shifted laterally by as much as one-fourth of the spot size of the light on the surface of the specimen, as measured perpendicular to an axis of the height sensor sub-system.

Increasing demands for smaller device geometries, higher throughput and yield, and lower manufacturing costs in semiconductor device manufacturing typically leads to increased precision and speed requirements for height sensor sub-systems of processing, metrology, and inspection systems. An embodiment of a height sensor sub-system, as described herein, may include a dual beam symmetric height sensor configured to assess, or determine, a height of a specimen such as a semiconductor wafer. The height sensor may generate an error signal that may be used to drive a Z-axis fine height adjustment of a system such as a processing, metrology, or inspection system. In this manner, a substantially constant working distance may be maintained between a surface of the specimen and an optical column of the system. The symmetrical optical design of the system may reduce, or even substantially eliminate, pattern-induced error in the determination of height. For example, the optical design of the system may be configured such that a height of a specimen or wafer having a substantially un-symmetric surface may be measured with relatively high sensitivity. Therefore, such a height sensor may be used to position a specimen within a system with high precision (i.e., on the order of less than about +/−1 $\mu$m) by eliminating pattern-induced error in the error signal.

Systems, as described herein, may be configured to maintain an absolute height of a specimen in approximately real time. For example, the height sensor may be used during inspection of a wafer to maintain a substantially focused beam of light on the wafer while a stage on which the wafer is located may be moving. In this manner, generating a focus map of the specimen prior to inspection may be eliminated. For example, generating a focus map may include assessing a height of a specimen at a plurality of locations across the specimen prior to processing, metrology, or inspection. The generated focus map may then be used during processing, metrology, or inspection to alter a height of the specimen depending on the location on the specimen being processed, measured, or inspected. Generating such a focus map increases process time. Therefore, a height sensor sub-system, as described herein, may reduce process time thereby increasing throughput of such systems.

Such a height sensor may be coupled in an on- or off-axis configuration to a system. In this manner, the height sensor may comply with mechanical and physical constraints of a process, metrology, or inspection tool.

In an embodiment, a system may be configured to assess a height of a specimen. The system may include an illumination system configured to direct a first and a second beam of light to a surface of the specimen at substantially opposite azimuth angles and at substantially equal angles of incidence. In this manner, the first and second beams of light may illuminate substantially the same area of the surface of the specimen. The illumination system may include a light source configured to emit broadband light such as a metal halide lamp. Alternatively, the illumination system may include an optical fiber coupled to a light source. In addition, the illumination system may also include two apertures illuminated by a light source. Each of the two apertures may include an opening having a diameter of approximately 400

μm to approximately 800 μm. For example, each of the two apertures may include an opening having a diameter of approximately 600 μm.

The illumination system may be configured to direct the first and second beam of light at a relatively shallow angle of incidence with respect to a surface of the specimen. For example, an angle of incidence between the first and second beams of light and a surface of a specimen may be about 4° to about 10°. The angles of incidence, however, may range from about 1° to about 45° depending on physical limitations of the system. Additionally, the illuminated area of the surface of the specimen may include an elliptical-shaped spot, a rectangular-shaped spot, or a square-shaped spot. A shape of the spot may vary depending on, for example, the illumination system and/or the apertures.

In a further embodiment, the system may include a collection system configured to collect the first beam of light specularly reflected from the surface of the specimen and to collect the second beam of light specularly reflected from the surface of the specimen. For example, the collection system may include two imaging lenses. Specularly reflected portions of the first and second beams of light may propagate along substantially opposite azimuth angles and along substantially equal angles of incidence. Therefore, the two imaging lenses may be positioned at substantially opposing azimuth angles and at substantially equal angles of incidence.

In an embodiment, the system may also include a first and a second beam splitter. The first beam splitter may be configured to direct the first collected beam of light to a first detector. The second beam splitter may be configured to direct the second collected beam of light to a second detector. The first and second beam splitters may also be replaced with half-silvered mirrors. The first and second detectors may be PSDs, CCD arrays, or TDI cameras. The first and second detectors may also include any detector configurable to determine a position of a light beam on the detector. The detectors may be configured to generate output signals. For example, the first detector may be configured to generate an output signal responsive to the first collected beam of light. In addition, the second detector may be configured to generate an output signal responsive to the second collected beam of light. Furthermore, the output signal generated by the first detector may be responsive to a position of the collected first beam of light on the first detector. Similarly, the output signal generated by the second detector may be responsive to a position of the collected second beam of light on the second detector.

In an additional embodiment, the system may include a device such as a differential amplifier. The device may be configured to receive the output signals from the first and second detectors. In addition, the device may be configured to generate a comparison, or error, signal from the output signals. The comparison signal may be responsive to the height of the specimen. The comparison signal may also be substantially independent of patterned features on the specimen. In this manner, the comparison signal may have a height precision of less than about +/−1 μm.

In an embodiment, the system may include a processing device. The processing device may be configured to receive the comparison signal. In addition, the processing device may be configured to alter the height of the specimen in response to the comparison signal. For example, the processing device may be configured to alter the height of the specimen by altering a position of a stage supporting the specimen or by adjusting a focus of the optical column to bring the specimen into focus. The processing device may be, for example, an inspection, metrology, or process tool. The tool may include a closed-loop system to maintain a substantially constant working distance between an optical column and the specimen during inspection, metrology, or processing.

Additional embodiments relate to a method for assessing, or determining, the height of a specimen. The method may include directing a first and a second beam of light to a surface of the specimen at substantially opposite azimuth angles and at substantially equal angles of incidence. In this manner, the first and second beams of light may illuminate substantially the same area of the surface of the specimen. The first and second beam may be directed to the surface at an angle of incidence of approximately 4° to approximately 10°. The angles of incidence, however, may range from about 1° to about 45° depending on physical limitations of the system. The illuminated area of the surface of the specimen may be an elliptical-shaped spot, a rectangular-shaped spot, or a square-shaped spot depending on, for example, a configuration of the illumination system. The illumination system may be configured as any of the embodiments described herein.

In a further embodiment, the method may include collecting the first and second beams of light specularly reflected from the surface of the specimen. The method may also include directing the collected first beam of light to a first detector and directing the second collected beam of light to a second detector. The first and second detectors may be configured as described herein. In addition, the method may include generating an output signal responsive to the first collected beam of light and generating an output signal responsive to the second collected beam of light. Furthermore, generating an output signal may be further responsive to a position of the first collected beam on the first detector and further responsive to a position of the second collected beam on the second detector.

The method may further include generating a comparison signal from the output signals. For example, the method may include sending the output signals responsive to the first and second collected beams of light to a differential amplifier. The comparison signal generated by the differential amplifier may be responsive to the height of the specimen. In addition, the comparison signal may be substantially independent of patterned features on the specimen. In this manner, the comparison signal may have a height precision of less than about +/−1 μm.

In an embodiment, the method may include altering the height of the specimen in response to the comparison signal. For example, altering the height of the specimen may include maintaining a substantially constant working distance between an optical column of a system and the specimen during processing, metrology, or inspection. In addition, altering the height of the specimen may include altering a position of a stage configured to support the specimen. Alternatively, the method may include altering a focus setting of an optical column in response to the comparison signal.

An additional embodiment relates to a semiconductor device that may be fabricated by a method. The method for fabricating the semiconductor device may include forming a portion of the semiconductor device upon a specimen such as a wafer. In addition, the method may also include any of the embodiments described above.

BRIEF DESCRIPTION OF THE DRAWINGS

Further advantages of the present invention may become apparent to those skilled in the art with the benefit of the following detailed description of the preferred embodiments and upon reference to the accompanying drawings in which.

Figure 1:
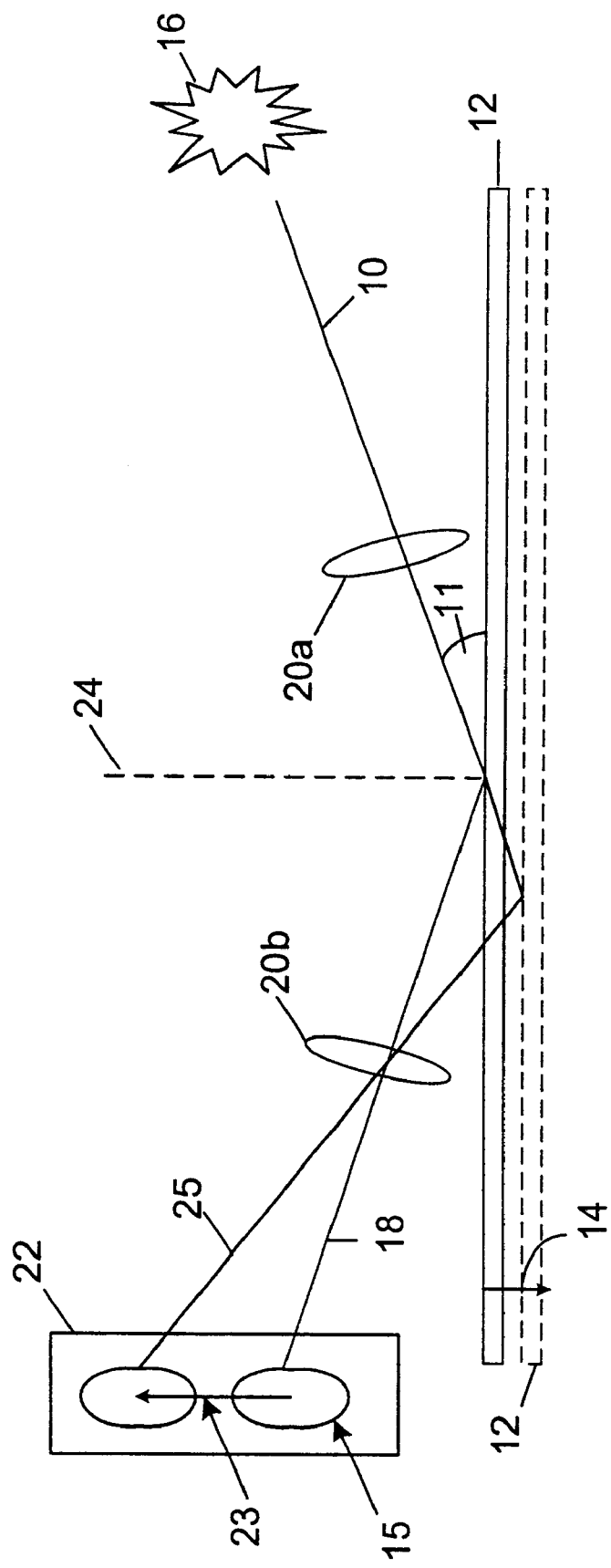
FIG. 1 depicts a schematic diagram of an embodiment of an on-axis height sensor sub-system.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning to the drawings, FIG. 1 illustrates an embodiment of an on-axis height sensor sub-system. As used herein, the term "off-axis height sensor sub-system" generally refers to a system in which the height measurement location is not the same as a sample location of a lithographic or metrology system. The term, "on-axis height sensor subsystem," as used herein, generally refers to a system in which the height measurement location is substantially the same as a sample location of a lithographic or metrology system, not shown but located along axis 24. For example, as shown in FIG. 1, the on-axis height sensor sub-system, such as on a processing, metrology, or inspection system, may direct light 10 at oblique angle 11 to a surface of specimen 12.

The system may be configured to determine a height of specimen 12. Specimen 12 may include, but may not be limited to, a wafer such as a substrate used for fabricating semiconductor devices. The system may include an illumination system. The illumination system may be configured to direct a beam of light to a surface of specimen 12. The illumination system may include a light source coupled to optical components. For example, the system may include light source 16. Light source 16 may be configured to generate light beam 10. An appropriate light source may include, but may not be limited to, a metal halide lamp, a xenon arc lamp, an incandescent lamp, a light emitting diode, a fiber optic light source, a helium neon laser, a solid state laser diode, or any other light source known in the art. As such, light beam 10 may include monochromatic light or broadband light. The illumination system may also include an optical fiber coupled to a light source.

Light beam 10 may be directed to the surface of specimen 12 by lens 20a. Lens 20a may be configured as a relay lens, an objective lens, an imaging lens, or another such lens known in the art. Light beam 10 may be directed to a surface of specimen 12 at angle of incidence 11, as measured with respect to the surface of specimen 12. Angle of incidence 11 may be an oblique angle, as shown in FIG. 1. For example, angle of incidence 11 may include an angle from about 4° to about 10°, as measured with respect to the surface of specimen 12. The angles of incidence, however, may range from about 1° to about 45° depending on, for example, physical limitations of the system. The illumination system may also include additional optical components such as folding mirrors and spectral or polarizing filters.

At least a portion of light beam 10 may be specularly reflected from the surface of specimen 12. The system may include a collection system that may be configured to collect the specularly reflected light. For example, the collection system may include lens 20b. Specularly reflected light beam 18 may be directed through lens 20b. Lens 20b may be configured to focus light beam 18 onto detector 22. Lens 20b may include any appropriate collecting, focusing, or imaging lens known in the art. The collection system may also include a number of other optical components such as partially transmissive mirrors and spatial filters.

Light beam 18 striking a surface of detector 22 may form incident light spot 15 on the surface of detector 22. Detector 22 may include a position sensitive detector ("PSD"). A PSD may be an opto-electronic device that may convert an incident light spot into position information. For example, an incident light spot may generate a photoelectric current in a PSD. The generated photoelectric current may flow through the device, and a mathematical relationship between the input and output currents of the device may be used to determine a position of the incident light spot. The position of the incident light spot may be given by a position of a centroid of the incident light spot. A PSD may have a sensitive area of approximately 1 mm by approximately 5 mm.

Detector 22 may be a 1-dimensional ("1-D") PSD. A 1-D PSD may be configured to detect a light spot moving over its surface in one dimension. Alternatively, detector 22 may be a 2-dimensional ("2-D") PSD. A 2-D PSD may be configured to detect a light spot moving over its surface in two dimensions. A 1-D PSD may be substantially linear in the sensitive direction. Such linearity may provide increased ability to match multiple incident light spots. In addition, a 1-D PSD may have a lower dark current than a 2-D PSD. For example, a typical dark current may be about 4 nA, and a typical capacitance may be about 5 pF. An appropriate PSD may be commercially available from SiTek Electro Optics, Partille, Sweden. In addition, detector 22 may include any 1- or 2-dimensional arrays of detectors known in the art, such as a bicell detector, a charge-coupled device ("CCD") type imaging array or a time delay integration ("TDI") camera.

A position of incident light spot 15 on detector 22 may vary depending on, for example, a vertical position, or height of specimen 12. For example, as shown in FIG. 1, as specimen 12 moves along a direction indicated by vector 14, reflected light 25 collected by lens 20b may be propagating along a path at a larger angle of incidence with respect to a surface of the specimen than an angle of incidence of reflected light 18. In this manner, a position of incident light spot 15 on detector 22 may be altered. For example, as shown in FIG. 1, incident light spot 15 may move along a length of detector 22 as indicated by vector 23 as specimen 12 moves along a direction indicated by vector 14. In this manner, a signal generated by detector 22 may indicate a location of incident light spot 15. Therefore, a signal generated by detector 22 may also indicate a height of specimen 12. As such, a signal generated by detector 22 may be used to determine the height of specimen 12.

The system as described above may also include additional optical components. For example, additional optical components may include, but may not be limited to, beam splitters, quarter wave plates, polarizers such as linear and circular polarizers, rotating polarizers, rotating analyzers, collimators, mirrors, dichroic mirrors, partially transmissive mirrors, filters such as spectral or polarizing filters, spatial filters, reflectors, and modulators. In addition, detector 22 may include a photodetector of any configuration and material known in the art depending on the type and power of incident light and the light receiving region requirements of the application. For example, silicon photodiodes may form both a narrow and wide light receiving region but may only detect visible light. Germanium ("Ge") and indium gallium arsenide ("InGaAs") photodiodes may be sensitive to infrared light. Ge photodiodes, however, may have large dark current, and InGaAs photodiodes may have a limited light receiving region. The PSD mounting may require both X and Y position adjustment in order to substantially capture the entire image and provide a reasonable offset for the pre-amplifying electronics.

As described above, a height of a specimen may alter a position of incident light beam 15 on detector 22. In addition, patterns on the surface of a specimen, such as topographical features, diffraction, and/or thin film interference patterns, may cause light intensity variations of the light reflected from the surface. As such, the intensity of the reflected light may be substantially reduced, in some cases, by greater than about 90% due to such patterns on the wafer surface. The intensity variations may also produce apparent shifts in a position of the reflected light beam. As such, surface patterns may cause a shift in the centroid of the incident light beam on the PSD that may affect a signal generated by the PSD, as described herein. For example, a centroid of an incident light beam on the PSD may be shifted by as much as approximately one-fourth of the spot size of the light on the surface of the wafer. The shift in a position of the centroid, or error, which may be commonly referred to as a pattern-induced shift or error, may result in an inaccurate assessment of the height of a specimen.

The height assessment of the specimen may be used to alter a focus of the specimen to bring the specimen into focus for subsequent processing. Therefore, during subsequent processing, the specimen may be substantially inaccurately positioned, or out of focus, due to the inaccurate assessment of the height of the specimen as described above. In addition, inaccurate positioning of the specimen during subsequent processing may adversely affect processes such as lithography, metrology, and inspection. For example, features formed on a specimen that is substantially out of focus during lithography may have a critical dimension that deviates substantially from a process design value for the critical dimension. In addition, a lateral dimension of features measured during metrology of a specimen that is substantially out of focus may be inaccurately determined. Furthermore, a presence of defects determined during inspection of a specimen that is substantially out of focus may also be inaccurately determined.

A number of techniques may be used to reduce pattern-induced error in systems such as the system illustrated in FIG. 1. For example, pattern-induced errors may be reduced by using a spatial filter to reduce the amount of random light scattered from the surface of the specimen. A filter may also be used to reduce random high frequency signals in the output from an amplifier coupled to the detector. In addition, a diffraction limited laser, for example, with a spot size of about 12 $\mu$m may be used as a light source in such a system. In this manner, a spot size of incident light on the surface of the specimen may be as small as possible thereby improving the focus of the incident light beam on a detector. These techniques, however, may only reduce a height error of the height sensor sub-system to about +/−1 $\mu$m or greater.

Other techniques to reduce pattern-induced errors in height sensor sub-systems may include using white light to reduce thin film interference produced by the specimen. In addition, a charge-coupled device ("CCD") camera or a time delay integration ("TDI") camera and image processing may be used to increase the accuracy of identifying an actual center of the image spot. Furthermore, error averaging may be used to increase an accuracy of the height sensor sub-system. For example, error averaging may include scanning a light beam over a surface of a specimen and taking an average of height measurements of several positions on the specimen. In this manner, error in the height measurements may be reduced by averaging multiple measurements. Error averaging may also include using large spot sizes (e.g., greater than about 1 mm) and/or using multiple sensors to reduce pattern-induced error in height measurements. Use of any of the above techniques, alone or in combination, may substantially reduce the pattern-induced error in the measurement signal. Systems incorporating such techniques, however, may still have a height error of at least about a few microns.

Figure 2A:
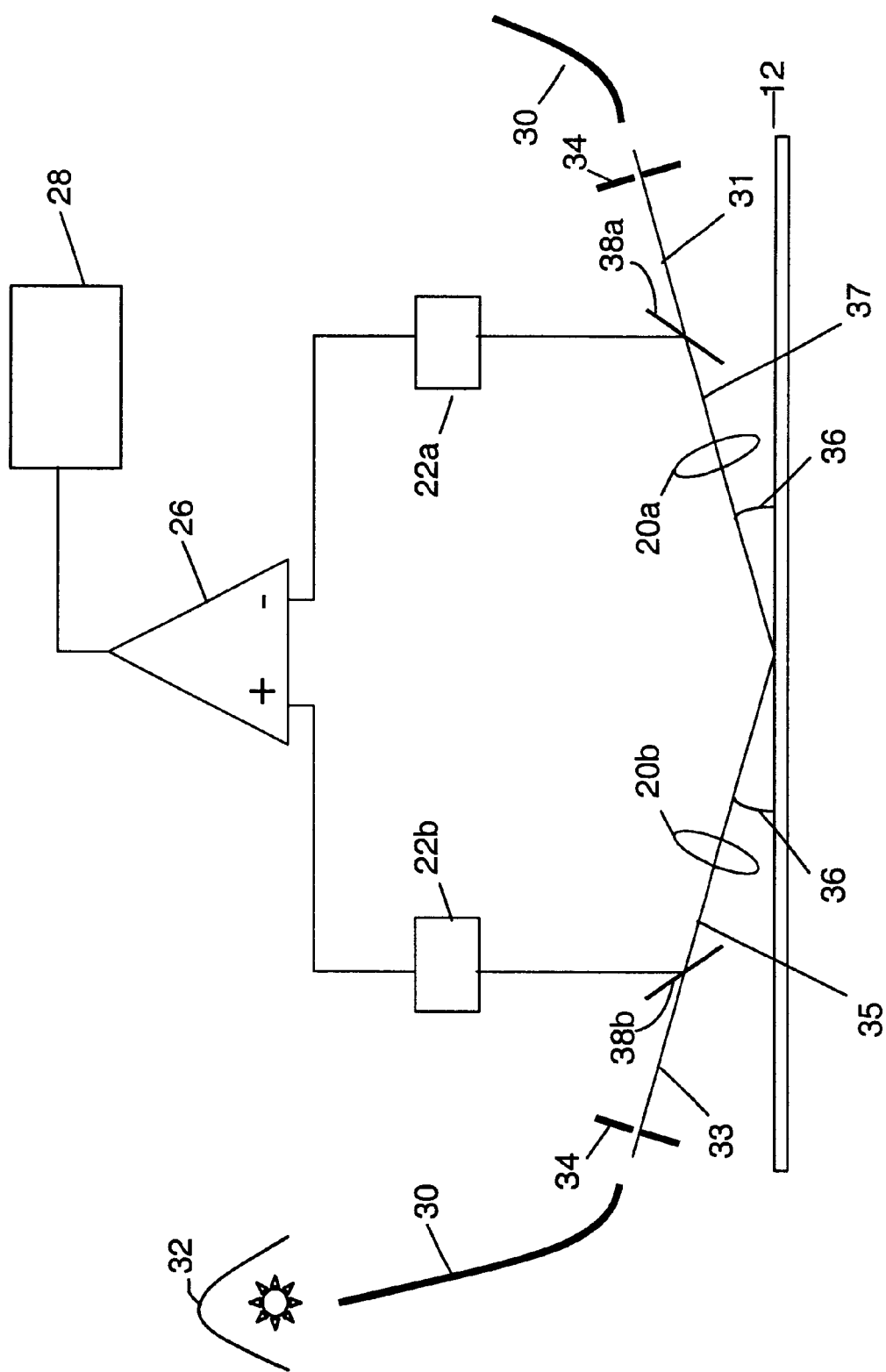
FIGS. 2a–2c depict schematic diagrams of embodiments of dual beam height sensor sub-systems.

FIG. 2a illustrates an embodiment of a dual beam symmetric height sensor subsystem. The system may include an illumination system. The illumination system may include optical fiber 30 illuminated by light source 32. Light source 32 may be a broadband spectrum lamp such as a metal halide lamp. Light source 32 may also include any other light sources as described herein. Optical fiber 30 may be configured to direct a first and a second beam of light to a surface of specimen 12. For example, the illumination system may include apertures 34. In this manner, optical fiber 30 may be configured to illuminate two substantially identical apertures 34. Apertures 34 may include any apertures known in the art. Apertures 34 may direct first beam of light 31 and second beam of light 33 from optical fiber 30 to opposing sides of a surface of specimen 12, such as a wafer. In this manner, the illumination system may be configured such that first beam of light 31 and second beam of light 33 may be directed to the surface of the specimen at substantially opposite azimuth angles.

Apertures 34 may also be configured to direct a first and a second beam of light at a shallow angle of incidence 36. Angle of incidence 36 may include, for example, an angle from about 4° to about 10°, as measured from the surface of the specimen. For example, first beam of light 31 and second beam of light 33 may be directed to a surface of specimen 12 at angle of incidence 36 of approximately 8°. The angles of incidence, however, may range from about 1° to about 45° depending on, for example, physical limitations of the system. An illuminated area on the surface of the specimen may be an elliptical-shaped spot, a rectangular-shaped spot, or a square-shaped spot. A shape of the spot may vary depending on, for example, a shape of the apertures. In addition, because the first and second beams of light are directed to the surface of the specimen at substantially opposite azimuth angles and at substantially equal angles of incidence, first beam of light 31 and second beam of light 33 may illuminate substantially the same area on the surface of specimen 12.

Apertures 34 may be circular apertures. Apertures 34, however, may also have any other shape opening such as rectangular or square. Each aperture may include an opening having a diameter of approximately 400 $\mu$m to approximately 800 $\mu$m. For example, the opening may have a diameter of approximately 600 µm. The apertures may also be configured such that an area of the surface of a specimen illuminated by light directed by the apertures may have a lateral dimension approximately equal to a diameter of the opening of the aperture. In this manner, light directed by the apertures may be 1:1 imaged on the surface of specimen 12. For example, circular apertures with approximately 600 µm diameter openings configured to direct first and second beams of light at angle of incidence 36 of approximately 8° to the surface of specimen 12 may produce elliptical beam spots on the surface of specimen 12 that may be approximately 4.5 mm×0.6 mm in size.

The system may also include a collection system. The collection system may be configured to collect at least a portion of the first beam of light specularly reflected from the surface of the specimen and to collect at least a portion of the second beam of light specularly reflected from the surface of the specimen. For example, the collection system may include lenses 20a and 20b. Lenses 20a and 20b may be configured as imaging lenses. Alternatively, lenses 20a and 20b may be any other lenses known in the art such as focusing lenses. Specularly reflected portions of the first and second beams of light may propagate along paths having substantially opposite azimuth angles and substantially equal angles of incidence. Therefore, the two lenses may be positioned at substantially opposing azimuth angles and at substantially equal angles of incidence. In this manner, at least a portion of specularly reflected first beam of light 35 may be collected by lens 20b. In addition, at least a portion of specularly reflected second beam of light 37 may be collected by lens 20a.

In an embodiment, the system may also include first beam splitter 38b and second beam splitter 38a. The beam splitters may be beam splitter mirrors that may be configured to transmit and reflect portions of light beams 35 and 37. Beam splitters 38a and 38b may also be polarizing beam splitters. In addition, the beam splitters may include any other beam splitters known in the art. Alternatively, the beam splitters may be replaced with half-silvered mirrors. The beam splitters may be configured to allow first beam of light 31 and second beam of light 33 to pass through the beam splitters without altering the path of the light beams. The beam splitters may also be configured to alter a path of specularly reflected first beam of light 35 collected by lens 20b and to alter a path of specularly reflected second beam of light 37 collected by lens 20a. For example, beam splitter 38b may be configured to direct at least a portion of first collected beam of light 35 to first detector 22b. In addition, beam splitter 38a may be configured to direct at least a portion of second collected beam of light 37 to second detector 22a.

Figure 2B:
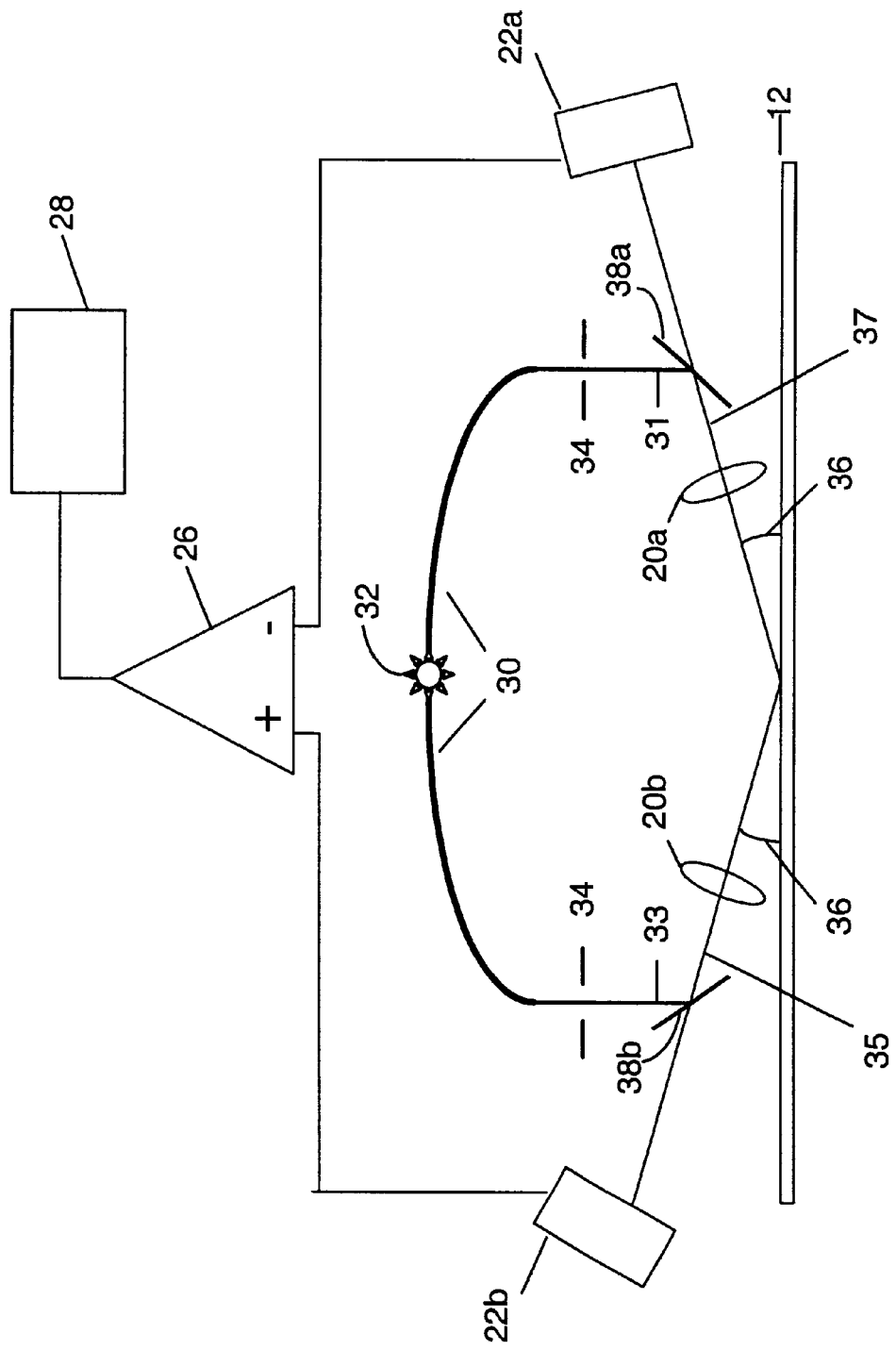

The positions of the illumination system and the detectors may be interchanged without affecting the basic principles of operation. For example, FIG. 2b illustrates an alternative embodiment in which the beam splitters may alter a path of the incident light beams. For example, beam splitter 38a may be configured to alter a path of first beam of light 31 such that beam 37 may be directed toward the surface of the specimen. Beam splitter 38b may be configured to alter a path of second beam of light 33 such that beam 35 may be directed toward the surface of the specimen. The beam splitters may be configured to allow beams 35 and 37 specularly reflected from the specimen to pass through the beam splitters to the detectors without being substantially altered. For example, beam splitter 38b may be configured to allow specularly reflected first beam of light 35 collected by lens 20b to pass through the beam splitter to first detector 22b without being substantially altered. In addition, beam splitter 38a may be configured to allow specularly reflected second beam of light 37 collected by lens 20a to pass through the beam splitter to second detector 22a without being substantially altered.

First detector 22b and second detector 22a may include PSDs, CCD arrays, or TDI cameras. The PSDs may be configured as described herein. The detectors may be configured to generate an output signal. For example, first detector 22b may be configured to generate an output signal responsive to a position of first collected beam of light 35 incident upon first detector 22b. In addition, second detector 22a may be configured to generate an output signal responsive to a position of second collected beam of light 37 incident upon second detector 22a. In addition, detectors 22a and 22b may be further configured to receive an approximately 1x magnification of the light directed by beam splitters 38a and 38b, respectively. Alternatively, detectors 22a and 22b may include any other opto-electronic device known in the art. For example, the first and second detectors may also include any detector configured to determine a position of a light beam on the detector.

As described herein, a dual beam symmetric height sensor sub-system may to include two substantially identical and opposing imaging systems. The imaging systems may include illumination and collection systems that project two beams of light reflected from substantially the same area of a specimen onto surfaces of detectors such as PSDs. Therefore, if specimen 12 moves vertically in either direction, incident light beams on detectors 22 may shift in substantially the same direction and with a factor of two magnification. As described above, a position of an incident light beam on a detector such as a PSD may also vary depending on a pattern on the surface of a specimen. If the surface of the specimen does not include any patterns such as patterns as described above, a height sensor sub-system may include a single imaging system, as described in FIG. 1. A substantial number of specimens submitted for processing, metrology, or inspection, however, may be heavily patterned such that reflectivity of the patterned surfaces may vary significantly. For example, height measurements of such heavily patterned specimens with a single imaging system may have an error of about one-fourth of the size of the light spot incident upon the surface of the specimen (e.g., 150 µm).

Figure 2C:
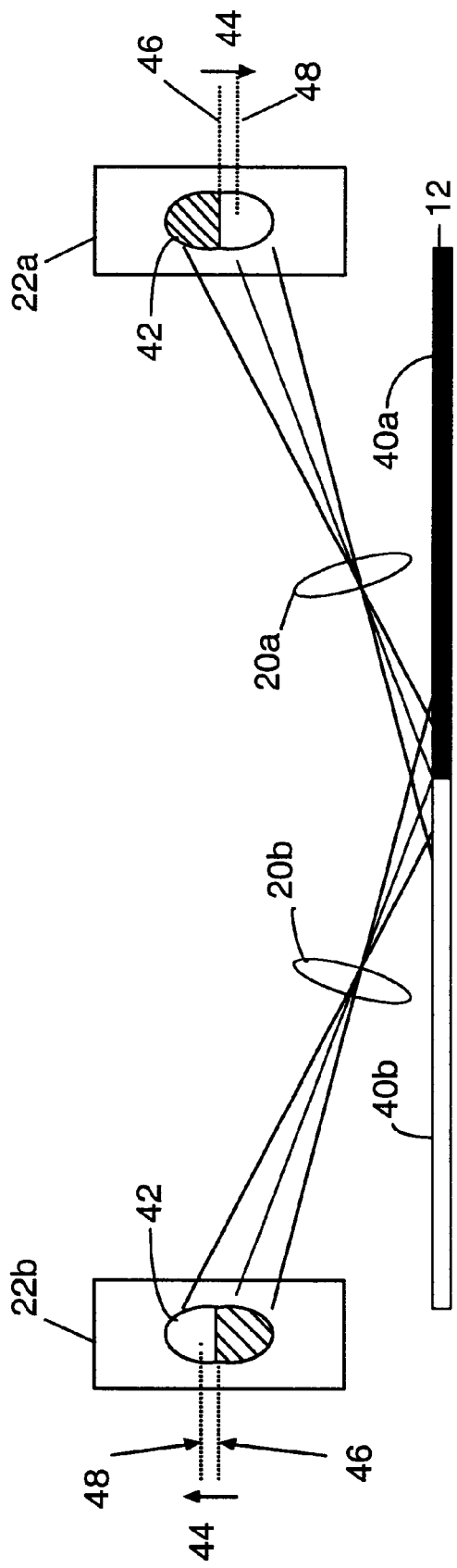

FIG. 2c illustrates a very severe case of a wafer pattern on an area of a surface of specimen 12. For example, portion 40a of specimen 12 may be substantially non-reflective, and portion 40b of specimen 12 may be relatively highly reflective. Therefore, an intensity of light beam reflected from specimen 12 may go through a step function change across a lateral dimension of the reflected light beam. The reflected light beam may be directed to detectors 22b and 22a by lenses 20b and 20a, respectively. In this manner, incident light beam spots 42 on detectors 22a and 22b may be partly bright and partly dark. As shown in FIG. 2c, however, incident light beams 42 on detectors 22a and 22b may be of opposite orientation. For example, the partly dark portion of the incident light beam spot may be toward the bottom of detector 22b, and the partly dark portion of the incident light beam spot may be toward the top of detector 22a.

A centroid of incident light spot 42 on detectors 22a and 22b may be shifted due to a pattern on a surface of specimen 12 in a direction indicated by vectors 44, as shown in FIG. 2c. For example, a pattern on the surface of specimen 12 may cause a centroid of incident light spot 42 to shift from position 46 to position 48 as shown in FIG. 2c. In this manner, the pattern-induced shift on a position of incident light spot 42 may translate into substantial variations in height measurements even if an actual specimen height remains substantially the same. Effectively, however, the pattern-induced height error may be substantially equal and opposite for the two detectors and thus may average to zero when the signals from the two detectors are combined. As such, the pattern-induced centroid shift is a common mode for the two detectors. In addition, if the actual height of the surface of the specimen changes, a position of incident light beams 42 on detectors 22a and 22b may shift in substantially the same direction. For example, the incident light beams may shift upwards on the two detectors if specimen 12 shifts downwards, and vice versa. Such a change in a position of the incident light beams may be commonly referred to as a height-induced shift. Therefore, a height-induced centroid shift is a differential mode for the two detectors.

As shown in FIG. 2a, device 26 may be configured to receive an output signal from detector 22a and detector 22b. Device 26 may include, but is not limited to a differential amplifier or an analog-to-digital converter and a processing device. The device may be configured to generate a comparison, or error, signal from the output signals from the two detectors. Therefore, the comparison signal may be responsive to the height of the specimen. In addition, the comparison signal may be substantially independent of a pattern on the surface of specimen 12. In this manner, the comparison signal may have a height precision of less than about +/−1 μm. Device 26 may also be configured to convert the comparison signal to a voltage. As such, device 26 may generate a position error signal.

The specimen may be supported upon a stage (not shown) of a processing system, a metrology system, or an inspection system. In this manner, the position error signal may be used to drive an adjustment to a vertical position of the stage or an adjustment to the focus setting of an optical column of the processing system, a metrology system, or an inspection system. The adjustment to the vertical position of the stage or the focus setting may alter a working distance between the specimen and an optical column of the system. For example, the adjustment to the vertical position of the stage or the focus setting may bring the specimen into focus. In this manner, the specimen may be in focus for subsequent processing, metrology, or inspection. In addition, in a closed-loop configuration, focusing of a specimen on a stage in this manner may be performed automatically during processing, metrology, or inspection. As such, the system may be configured to maintain a substantially constant working distance between an optical column of a system and the specimen. Such a differential amplifier may also be coupled to imaging systems as illustrated in FIG. 2a.

In an embodiment, the system may include processing device 28. Processing device 28 may be configured to receive the comparison signal or the position error signal generated by device 26. In addition, processing device 28 may be configured to alter a height of the specimen or a focus setting of an optical column of a processing system, a metrology system, or an inspection system in response to the comparison signal or the position error signal. For example, the processing device may be configured as a controller computer. In this manner, the processing device may be configured to convert the comparison signal into a position error signal that may be received by a controller for a stage (not shown) of a processing system, a metrology system, or an inspection system. As such, processing device 28 may be configured to alter the height of the specimen by altering a position of a stage supporting the specimen. In addition, or alternatively, the processing device may be configured to convert the comparison signal into a position error signal that may be received by a controller for an optical column (not shown) of a processing system, a metrology system, or an inspection system. Therefore, processing device 28 may be configured to alter a focus setting of the optical column.

As described herein, the system may be configured to project a reflected beam of light onto two substantially symmetrical detectors that may electronically suppress the pattern-induced common mode. As such, the system may require substantially precise overlapping of the first and second beams of light on the surface of the specimen. Mechanical and/or physical configurations of opposing optical components of the system may be substantially the same such that the directed first and second beams of light illuminate substantially the same area of the surface of the specimen. In addition, because the long axis of an elliptical-shaped area illuminated on the surface of the specimen may be longer than a depth of focus of an imaging lens, the edges of the illuminated areas may be defocused at the surface of the specimen. As such, height measurements of the system may be sensitive to tilt of the system. For example, a system configured to illuminate an elliptical area which has an axial dimension of approximately 600 μm having about 13 μm of mechanical tolerance may have a pattern cancellation of about 50:1. In this manner, if patterns on the surface of a specimen introduce as much as about 50 μm of error on each of the two detectors, the dual beam system may still perform within the specified tolerance of the system.

For height sensor sub-systems, in which light may be directed through an aperture opening to a specimen surface and then to a detector such as a PSD, broadband light sources may be used. For example, such light sources may exhibit many substantially incoherent wavelengths of light and may not produce a speckle effect on the detector as may be seen with laser sources. Alternatively, such a system may include a light emitting diode ("LED"). For example, a white light LED may produce a wide spectrum of wavelengths of light, but an intensity of a white light LED may be lower than an intensity of a lamp. In addition, a white light LED may be modulated or demodulated to achieve reasonable signal to noise ratios. An embodiment, as described herein, may utilize a metal halide lamp as a light source and fiber optic coupling for substantially simplified implementation. However, an appropriate light source may include, but may not be limited to, a helium neon laser, a solid state laser diode, a xenon arc lamp, an incandescent lamp, a light emitting diode, multiple light emitting diodes with multiple wavelengths, a fiber optic light source, or any other light source known in the art, including those described above, depending on the application requirements.

A reflectivity of a surface of a specimen may vary depending on, for example, the wavelength of light incident upon the surface. In addition, due to the nature of oblique incidence of light, light reflected from a specimen may vary depending on properties of film layers proximate an upper surface of the specimen. Such film layers may include, for example, thin films formed on a wafer that may be used for semiconductor device fabrication. Thin films may include, but are not limited to, conductive layers and dielectric layers. In addition, a reflectivity of a film layer on a specimen may vary as a function of thickness of the film layer. Furthermore, there may be specific film layer thicknesses at which the reflectivity of the surface may be substantially lower. Therefore, a white light source such as a metal halide lamp may reduce variations in reflectivity that may be due to such film layers.

A reflectivity of a surface may also depend on polarization of light directed to the surface of a specimen. In addition, polarization of light directed to the specimen in combination with a thickness of the film layer may alter a reflectivity of the surface. In addition, reflectivity variations for "p" and "s" components of polarization may be substantially different. The term "p component" is used to describe the component of polarized radiation having an electrical field in the plane of incidence of the reflected beam of light. The term "s component" is used to describe the component for polarized radiation having an electrical field which is perpendicular to the plane of incidence of the reflected beam of light. The sum of the two components of polarization may produce the least amount of variation in reflectivity of the surface of a specimen. Therefore, randomly polarized light may be directed to a surface of specimen without further polarization control. The reflected light, however, may be partially polarized, which may affect a path of the reflected light through a beam splitter. In most cases, however, the effect of polarization on a path of reflected light may be negligible and may be addressed, for example, by a means of normalization.

If a transparent film is formed on a specimen, both top and bottom surfaces of the film may reflect a beam of light. In this manner, the reflected beam of light may not accurately measure a height of the specimen. For example, for approximately every 1 $\mu$m of oxide on an aluminum layer, approximately 0.24 $\mu$m of error may occur in a height measurement. Current integrated circuit ("IC") design rules, however, rarely call for thin film thicknesses over approximately 2 $\mu$m. Therefore, such an error may be considered substantially insignificant. In addition, a magnitude of error introduced into a height measurement by a transparent film may be assessed. For example, multiple reflections may be determined using Fresnel's equations for both "s" and "p" polarizations. A centroid produced from the sum of the reflections may be determined and may be compared to a centroid produced by 100% reflectivity from a top surface of the film.

Figure 3:
FIG. 3 depicts a schematic diagram of an embodiment of a dual beam height sensor sub-system.

FIG. 3 illustrates an additional embodiment of an optical design for a dual beam symmetric height sensor sub-system. Since the height sensor may be configured in an optically symmetrical configuration, only one of the dual beam optical paths is shown in FIG. 3. Aperture 34, specimen 12, and detector 22 may be configured such that the system may have an optical magnification very close to 1. The system may also include a pair of achromat doublets 50. The pair of achromat doublets may be configured for 1:1 imaging of a beam of light onto a surface of a specimen. For example, the pair of achromat doublet may have a substantially clear aperture of approximately 7.5 mm. In addition, the pair of achromat doublets may be positioned between aperture 34 and specimen 12 such that a distance of about 100 mm separates the achromat doublets from the aperture and the specimen. The numerical aperture ("NA") for such a system may be approximately 0.0375. An optical extent of the system may, therefore, be approximately 22.5 $\mu$m, given an aperture diameter of about 600 $\mu$m. The optical extent of the system may substantially determine a light collection efficiency of an illuminated optical fiber (not shown). As such, for example, a minimum of about 20 $\mu$W of light may be needed to illuminate an optical fiber in order to achieve an adequate signal to noise ratio on detector 22.

Aperture 34 may be configured to direct light beam 10 on a surface of specimen 12. Because light beam 10 may be directed to a surface of the specimen at an oblique angle of incidence, as measured with respect to the surface of the wafer, the illuminated area of the surface of the specimen may be elliptical-shaped. In addition, the elliptical-shaped illuminated area may have an aspect ratio of approximately 1:tan(angle of incidence). An appropriate size for aperture 34 may be approximately 600 $\mu$m. In addition, the sizes of the two apertures in the system may vary by less than about 1%. The diameter of the apertures may be relatively small with respect to an illumination spot generated by the optical fiber (as shown in FIG. 2a). In this manner, illumination from the optical fiber may be substantially uniform over the entire surface of the aperture. Such illumination uniformity may be essential for matching the two illumination areas on the surface of the specimen.

A long axis of the illuminated area may be approximately 4.3 mm for an incident angle of approximately 8°. The edges of the illuminated area, however, may not be well defined since 4.3 mm may be substantially longer than a depth of focus of an imaging lens. To obtain a smaller illuminated area on the surface of a specimen, even smaller apertures may be used. A reduced optical extent of a smaller aperture, however, may reduce light throughput of the aperture and may also increase a signal to noise ratio of light directed to detector 22. The amount of light needed may also depend on system bandwidth and error requirements for specific applications. For example, for systems with approximately 20 $\mu$W of light intensity and about +/−1 $\mu$m of height error tolerance, an aperture of approximately 600 $\mu$m may provide adequate light even if the specimen reflectivity is approximately 1%. Mechanical adjustment requirements for the apertures may be X and Y for positioning and overlapping of the two illuminated areas on the surface of the specimen underneath an optical column of a system, and Z for focus.

Achromat lens pair 50 may be configured to image light from aperture 34 onto specimen 12. Achromat lens pair 50 may provide substantially superior imaging quality over a single achromat for 1:1 imaging. A higher quality imaging system, however, may not be needed since the focus quality may not directly translate into a height measurement accuracy, and since edges along the long axis of the illuminated area may be defocused. A distance between the two lenses may be approximately 10 mm. A distance between the two lenses, however, may be varied within a substantially wide range without substantially affecting the imaging quality. In addition, achromats 50 may be tilted at approximately 2° with respect to the optical path in order to reduce, or to substantially eliminate, any multiple reflections from reaching detector 22.

The system may also include beam splitter 38. Several types of beam splitters may be used as described above. In addition, beam splitter 38 may include a pellicle beam splitter. A pellicle may be a very thin nitrocellulose membrane bonded to an aluminum frame. For example, a thin membrane of a pellicle beam splitter may be about 2 $\mu$m thick. Ghost images may be reduced, and even substantially eliminated, by a thinness of the membrane, since the second surface reflection may be superimposed on the first surface reflection. In addition, the pellicle beam splitter may have an open aperture of about 15 mm. For such a beam splitter, a splitting ratio may be about 40:40 in the visible light range. Such pellicle beam splitters are commercially available from CVI Laser, Albuquerque, N.Mex. Careful installation and maintenance of beam splitters may be required since a beam splitter in a dual beam system may be located substantially close to a detector. In this manner, any particles on or slight distortions of the beam splitter film may alter the image on the detector.

The system may also include windows that allow light transmission without affecting the performance of the height sensor sub-system. Such windows may be used to reduce, and even prevent, dust or other contamination or to allow the sample to be in a controlled environment such as a vacuum. For example, the windows may be tilted at an angle of about 5° with respect to an optical path of the system. In this manner, multiple reflections from the window surfaces, which may cause a constant background on a detector, may be substantially eliminated.

Detector 22, as illustrated in FIG. 3, may also be tilted at about 2° with respect to an optical path of the system to reduce, or substantially eliminate, reflections from propagating back to the optical system. If detector 22 is configured as a 2-D detector with good position linearity, X-Y position adjustments of the system may be substantially eliminated. In this manner, the system may have fewer and less complex mechanical requirements.

Figure 4:
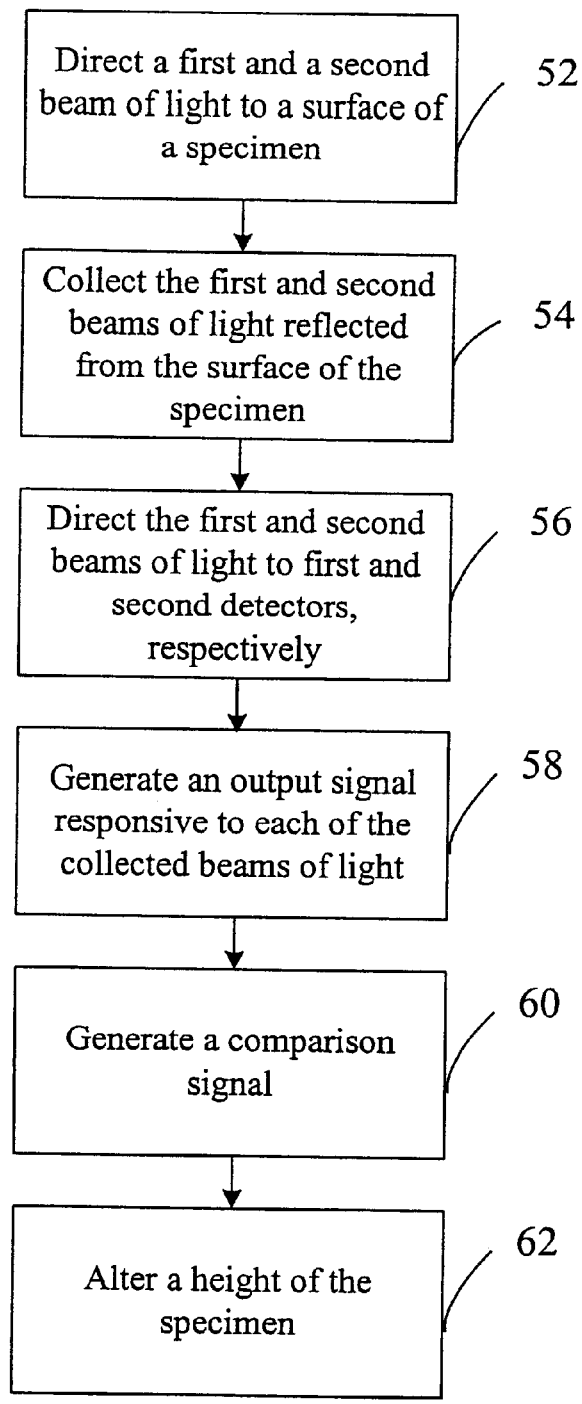
FIG. 4 depicts a flow chart illustrating an embodiment of a method for determining the height of a specimen.

FIG. 4 illustrates an embodiment of a method for assessing the height of a surface of a specimen such as a wafer. The method may include directing a first and a second beam of light to a surface of the specimen, as shown in step 52. The first and second beams of light may be generated by any of the light sources as described herein. In addition, the first and second beams of light may be directed by any of the illumination system as described herein. The light beams may be directed at substantially opposite azimuth angles and at substantially equal angles of incidence such that the first and second beams of light illuminate may substantially the same area on the surface of the specimen. The method may also include collecting at least a portion of the first and second beams of light specularly reflected from the surface of the specimen, as shown in step 54. For example, the first and second beams of light may be collected through two imaging lenses, as described herein.

In addition, the method may include directing the collected first beam of light to a first detector and directing the collected second beam of light to a second detector, as shown in step 56. The method may further include generating an output signal responsive to the collected first beam of light and generating an output signal responsive to the collected beam of light, as shown in step 58. Generating an output signal may be further responsive to a position of the collected first beam of light on the first detector and further responsive to a position of the collected second beam of light on the second detector. Furthermore, the method may include generating a comparison signal from the output signals, as shown in step 60. The comparison signal may be responsive to the height of the specimen and may be substantially independent of patterns on the specimen as described herein. In this manner, the method may also include altering a height of the specimen in response to the comparison signal, as shown in step 62. For example, altering the height of the specimen may include altering a position of a stage configured to support the specimen. Alternatively, the method may include altering a focus setting of an optical column of a processing system, a metrology system, or an inspection system in response to the comparison signal. Therefore, a substantially constant working distance between an optical column of a system and the specimen may be maintained during processing, metrology, or inspection.

An additional embodiment relates to a semiconductor device, which may be fabricated by an embodiment of a method. For example, the method may include forming a portion of a semiconductor device upon a specimen such as a wafer. Forming a portion of a semiconductor device may include performing a step of a semiconductor fabrication process, an entire semiconductor fabrication process, or a number of semiconductor fabrication processes. The method may also include any of the embodiments describe above.

Example: PSD Signals As A Function Of Height Change

Figure 5:
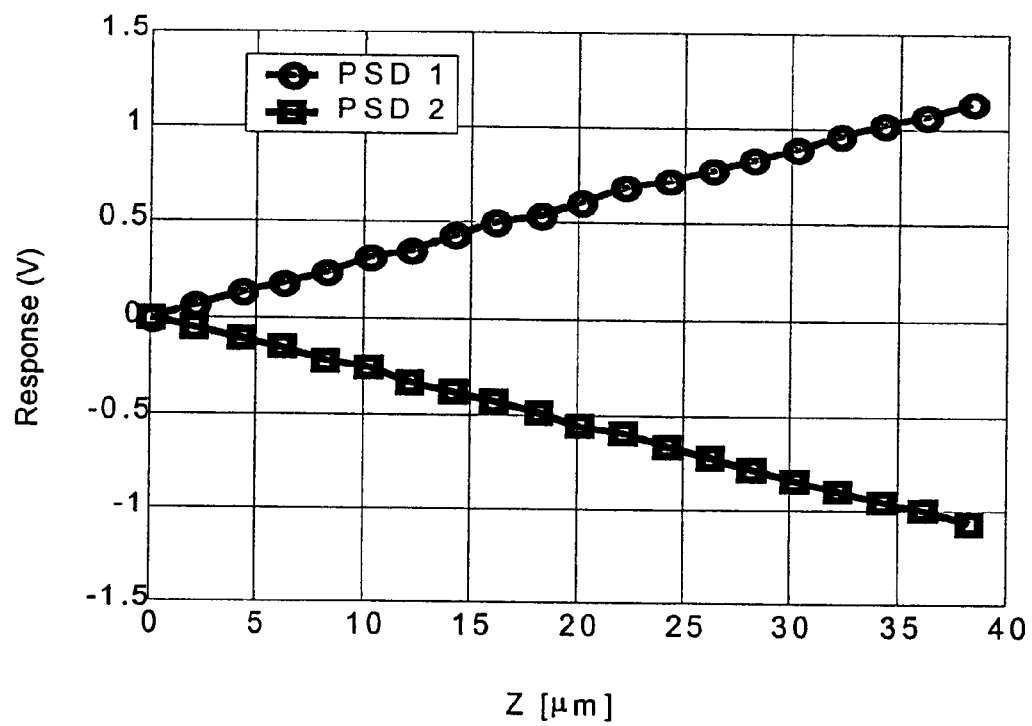
FIG. 5 depicts a response of a PSD as a function of changes in the Z-height of a mechanical stage.

FIG. 5 illustrates an example of a response of two PSDs vs. a Z height change of a specimen. The PSDs were incorporated in a system as described above. In addition, the PSDs were configured as described above. The height of the specimen was altered by a mechanical stage. As shown in FIG. 5, the two PSDs had opposite responses to the height change. For example, a response of PSD 1, as measured by a voltage of an output signal of the PSD, increases as a height of the specimen increases. In contrast, a response of PSD 2, as measured by a voltage of an output signal of the PSD, decreases as a height of the specimen increases. The sign of the slope of the lines may vary depending on, for example, mechanical configuration of the system. The response of both detectors across a height range of about 40 mm is substantially linear. If the slopes of the two PSDs are substantially different, the height of the specimen may be proportional to an approximate difference between the two PSDs. If the slopes of the two PSDs are substantially the same, the height of the specimen may be proportional to an approximate sum of the two PSDs. Slight differences in the absolute slope may be corrected through a calibration, and a correction coefficient may be incorporated in processing firmware of the system.

Example: Experimental Data Taken With A Heavily Patterned Specimen

Figure 6A:
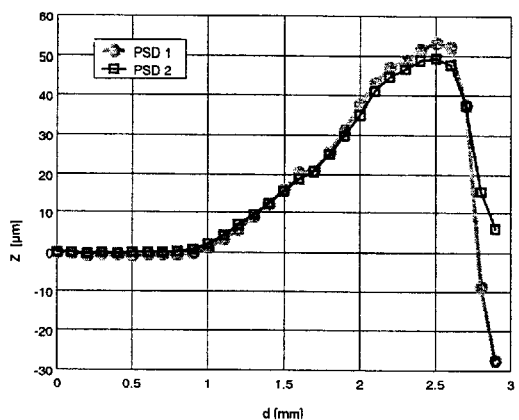
FIGS. 6a–6e depict height measurement signals due to wafer edges and wafer patterns.

A severe form of a pattern on the surface of a specimen, as illustrated in FIG. 2c, may be produced when a beam of light illuminates a cleaved edge of a wafer. In this manner, a portion of the beam of light may not be reflected. The difference in intensity across the reflected beam of light may cause a severe centroid shift on the each of the detectors. FIG. 6a illustrates a plot of height of a specimen in a z-direction, Z, ($\mu$m) versus a scan distance, d (mm). As illustrated in FIG. 6a, during scanning of a cleaved edge of a specimen, each PSD exhibited greater than approximately 50 $\mu$m of position error. Height measurements of each PSD, however, were approximately equal over a substantially large range of approximately 3 mm.

Figure 6B:
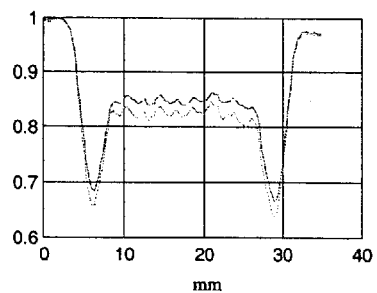
Figure 6D:
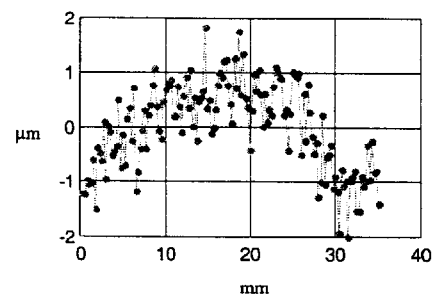
Figure 6C:
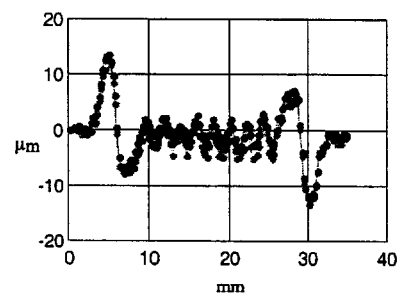
Figure 6E:
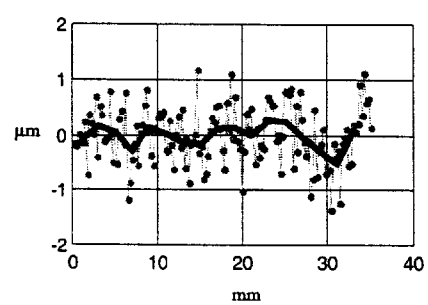

FIGS. 6b–6e illustrate data taken by scanning a heavily patterned wafer. FIG. 6b illustrates the normalized sum signal of two PSDs as a function of a position across the wafer (mm), indicating that the sample reflectivity is varying as a function of position across the wafer. FIG. 6c illustrates height measurements (mm) of two PSDs as a function of a position across the wafer (mm). As shown in FIG. 6c, height measurements of both of the two PSDs indicate over +/−10 $\mu$m of height error. Such height error may be caused by the pattern on the surface of the wafer. FIG. 6d illustrates a difference signal ($\mu$m) of the two PSDs as a function of a position across the wafer (mm). As shown in FIG. 6d, taking the difference of the signals generated by two PSDs, configured as described above, may substantially reduce pattern-induced error in height measurements. For example, the signals generated by each PSD may have greater than approximately +/−10 $\mu$m of error while the difference signal may have only about +/−1 $\mu$m of error. If the wafer has a slight bow (i.e., is warped), a quadratic fit and subtraction may minimize height error due to bowing of the wafer. FIG. 6e illustrates height measurement data ($\mu$m) after a quadratic fit and subtraction versus a position across the wafer (mm). As shown in FIG. 6e, no obvious patterns can be observed in the data after a quadratic fit and subtraction has been performed. Therefore, the majority of the error remaining after a quadratic fit and subtraction may be substantially due to electronics of the system.

Further modifications and alternative embodiments of various aspects of the invention may be apparent to those skilled in the art in view of this description. For example, a system configured to assess a height of a specimen may include a dual beam symmetrical height sensor sub-system. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to assess a height of a specimen during use, comprising:

an illumination system configured to direct a first and a second beam of light to a surface of the specimen at substantially opposite azimuth angles and at substantially equal angles of incidence during use such that the first and second beams of light illuminate substantially the same area of the surface of the specimen;

a collection system configured to collect the first beam of light specularly reflected from the surface of the specimen and to collect the second beam of light specularly reflected from the surface of the specimen during use;

first and second detectors, wherein the first detector is configured to generate an output signal responsive to the collected first beam of light, and wherein the second detector is configured to generate an output signal responsive to the collected second beam of light during use; and a device configured to receive the output signals from the first and second detectors during use and to generate a comparison signal from the output signals during use, wherein the comparison signal is responsive to the height of the specimen.

2. The system of claim 1, wherein the illumination system comprises a light source, and wherein the light source is configured to emit broadband light.

3. The system of claim 1, wherein the illumination system comprises an optical fiber coupled to a light source.

4. The system of claim 1, wherein the illumination system comprises two apertures illuminated by a light source.

5. The system of claim 1, wherein the angles of incidence comprises an angle between about 1° and about 45° from the surface of the specimen.

6. The system of claim 1, wherein the collection system comprises two imaging lenses.

7. The system of claim 1, wherein the output signal generated by the first detector is further responsive to a position of the collected first beam of light on the first detector, and wherein the output signal generated by the second detector is further responsive to a position of the collected second beam of light on the second detector.

8. The system of claim 1, wherein the comparison signal is substantially independent of patterned features on the specimen.

9. The system of claim 1, wherein the comparison signal is substantially independent of patterned features on the specimen such that a height precision of the comparison signal comprises less than about +/−1 μm.

10. The system of claim 1, further comprising a processing device coupled to the system and configured to receive the comparison signal during use, wherein the processing device is further configured to alter a height of the specimen in response to the comparison signal by altering a position of a stage configured to support the specimen.

11. The system of claim 1, further comprising a processing device, wherein the processing device is configured to receive the comparison signal during use, and wherein the processing device is further configured to alter a focus setting of an optical column in response to the comparison signal.

12. The system of claim 1, wherein the system comprises a closed-loop configuration such that the system is further configured to maintain a substantially constant working distance between an optical column of the system and the specimen during processing, metrology, or inspection.

13. The system of claim 1, wherein the system comprises an inspection tool, a metrology tool, or a process tool.

14. A method for assessing a height of a specimen, comprising:

directing a first and a second beam of light to a surface of the specimen at substantially opposite azimuth angles and at substantially equal angles of incidence such that the first and second beams of light illuminate substantially the same area of the surface of the specimen;

collecting the first and second beams of light specularly reflected from the surface of the specimen;

generating an output signal responsive to the collected first beam of light and an output signal responsive to the collected second beam of light; and generating a comparison signal from the output signals, wherein the comparison signal is responsive to the height of the specimen.

15. The method of claim 14, wherein generating the output signals comprises directing the collected first beam of light to a first detector and the collected second bema of light to a second detector.

16. The method of claim 14, wherein the first and second beams of light comprise broadband light.

17. The method of claim 14, wherein directing the first and second beams of light comprises illuminating an optical fiber with a light source.

18. The method of claim 14, wherein directing the first and second beams of light comprises illuminating two apertures with a light source.

19. The method of claim 14, wherein the angles of incidence comprise an angle between about 1° and about 45° from the surface of the specimen.

20. The method of claim 14, wherein the output signal responsive to the collected first beam of light is further responsive to a position of the collected first beam of light on a first detector, and wherein the output signal responsive to the collected second beam of light is further responsive to a position of the collected second beam of light on a second detector.

21. The method of claim 14, wherein the comparison signal is substantially independent of patterned features on the specimen.

22. The method of claim 14, wherein the comparison signal is substantially independent of patterned features on the specimen such that a height precision of the comparison signal comprises less than about +/−1 μm.

23. The method of claim 14, further comprising altering the height of the specimen in response to the comparison signal to maintain a substantially constant working distance between an optical column of a system and the specimen during processing, metrology, or inspection.

24. The method of claim 14, further comprising altering the height of the specimen by altering a position of a stage configured to support the specimen.

25. The method of claim 14, further comprising altering a focus setting of an optical column in response to the comparison signal.

* * * * *

UNITED STATES PATENT AND TRADEMARK OFFICE
CERTIFICATE OF CORRECTION

PATENT NO.    : 6,597,006 B1
DATED         : July 22, 2003
INVENTOR(S)   : McCord et al.

It is certified that error appears in the above-identified patent and that said Letters Patent is hereby corrected as shown below:

<u>Column 20,</u>
Line 38, please delete the word "bema" and substitute therefor -- beam --.

Signed and Sealed this

Thirtieth Day of September, 2003

JAMES E. ROGAN
*Director of the United States Patent and Trademark Office*